United States Patent
Cai et al.

(10) Patent No.: US 9,214,991 B2
(45) Date of Patent: Dec. 15, 2015

(54) METHOD, DEVICE, AND SYSTEM FOR IMPLEMENTING MICROWAVE MULTIPLE-INPUT MULTIPLE-OUTPUT

(71) Applicant: HUAWEI TECHNOLOGIES CO., LTD., Shenzhen (CN)

(72) Inventors: Meng Cai, Chengdu (CN); Kun Li, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/192,233

(22) Filed: Feb. 27, 2014

(65) Prior Publication Data

US 2014/0177757 A1 Jun. 26, 2014

Related U.S. Application Data

(63) Continuation of application No. PCT/CN2011/080862, filed on Oct. 17, 2011.

(51) Int. Cl.
*H04B 7/02* (2006.01)
*H04L 1/02* (2006.01)
(Continued)

(52) U.S. Cl.
CPC .......... *H04B 7/0413* (2013.01); *H04B 7/0697* (2013.01); *H04L 27/18* (2013.01)

(58) Field of Classification Search
CPC ..... H04B 7/0413; H04B 7/0697; H04L 27/18
USPC .................. 375/260, 267, 295, 316
See application file for complete search history.

(56) References Cited

U.S. PATENT DOCUMENTS

| 6,728,517 B2 | 4/2004 | Sugar et al. ............. 455/73 |
| 7,486,720 B2 | 2/2009 | Molisch et al. ............ 375/219 |

(Continued)

FOREIGN PATENT DOCUMENTS

| CN | 1695318 A | 11/2005 |
| CN | 1949678 A | 4/2007 |

(Continued)

OTHER PUBLICATIONS

Extended European Search Report issued on Jul. 18, 2014 in corresponding European Patent Application No. 11 850 651.8.

(Continued)

*Primary Examiner* — Freshteh N Aghdam
(74) *Attorney, Agent, or Firm* — Staas & Halsey LLP

(57) ABSTRACT

A method, device and system for implementing microwave multiple-input multiple-output, relate to the field of wireless communications. The device includes a transmit channel correction module including a transmission energy distributor and a transmission coupler; the transmission energy distributor decomposes, according to a first energy distribution parameter, each channel of transmitted signals among N channels of transmitted signals into channels of transmitted sub-signals, where the number of the channels of transmitted sub-signals is the same as the number of transmit antennas, the number of transmit antennas is N, and N is a natural number greater than 1; and the transmission coupler performs phase processing on each channel of transmitted sub-signals according to a first phase parameter, selects one channel of phase-processed transmitted sub-signals from each of the N channels of transmitted signals, and combines them to obtain N channels of output signals.

16 Claims, 6 Drawing Sheets

(51) Int. Cl.
*H04B 7/04* (2006.01)
*H04B 7/06* (2006.01)
*H04L 27/18* (2006.01)

(56) References Cited

U.S. PATENT DOCUMENTS

| | | |
|---|---|---|
| 7,545,778 B2 | 6/2009 | Sugar et al. ............... 370/335 |
| 2004/0082356 A1* | 4/2004 | Walton et al. ............. 455/522 |
| 2007/0081450 A1 | 4/2007 | Hayase et al. ............. 370/210 |
| 2013/0012144 A1* | 1/2013 | Besoli et al. ............... 455/85 |
| 2013/0148593 A1* | 6/2013 | Suzuki ............. H04L 5/0051 370/329 |
| 2014/0050187 A1* | 2/2014 | Nakshima ......... H04L 5/0048 370/329 |

FOREIGN PATENT DOCUMENTS

| | | |
|---|---|---|
| CN | 101166030 A | 4/2008 |
| JP | 2006-287613 | 10/2006 |
| WO | 2011/019310 A1 | 2/2011 |

OTHER PUBLICATIONS

International Search Report issued on Dec. 1, 2011 in corresponding International Application No. PCT/CN2011/080862.

International Search Report mailed Nov. 21, 2011, in corresponding International Patent Application No. PCT/CN2011/080862.

* cited by examiner

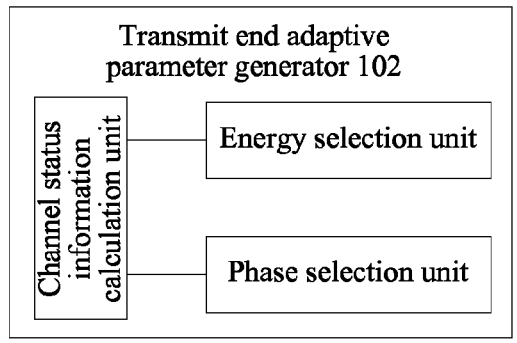
FIG. 3
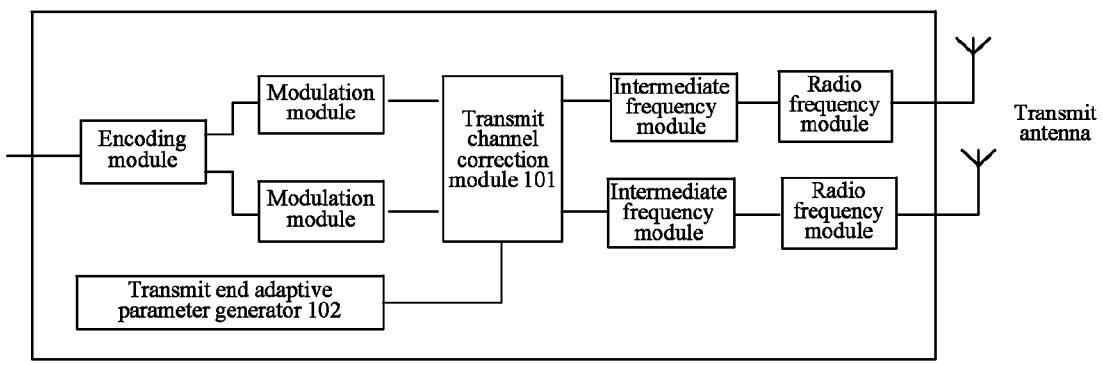
FIG. 4-a
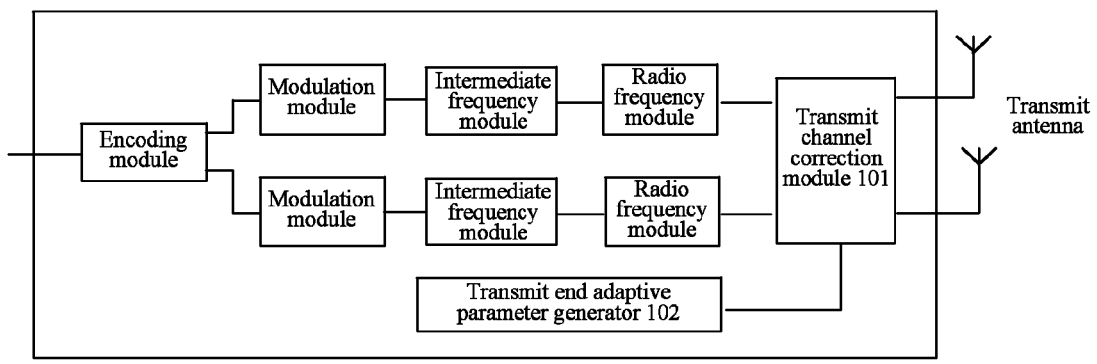
FIG. 4-b

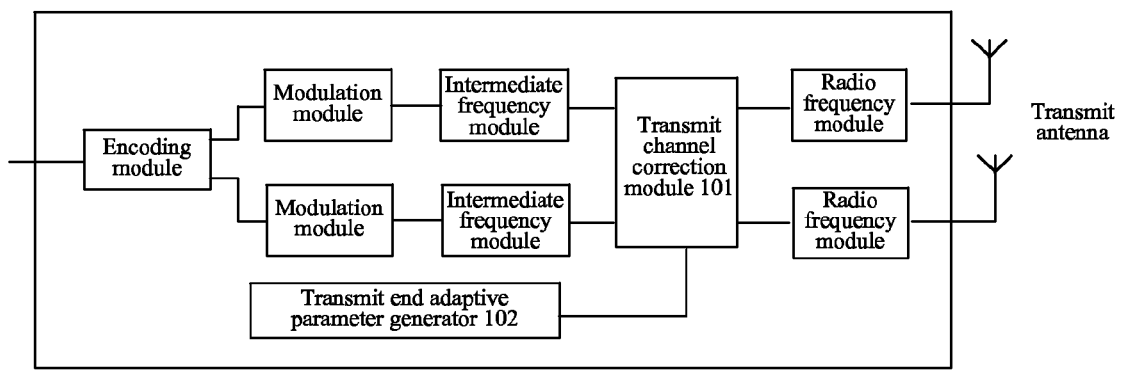
FIG. 4-c
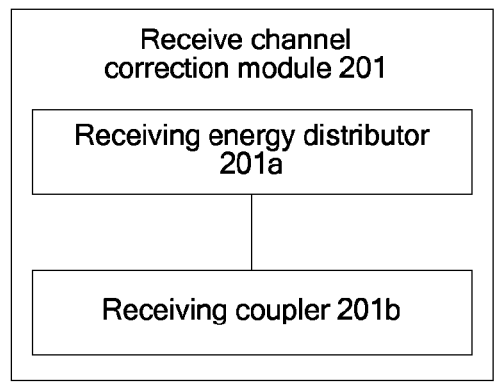
FIG. 5

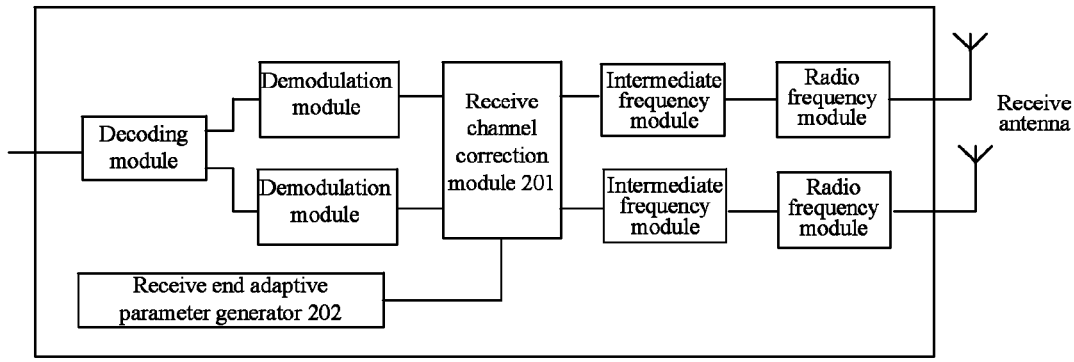
FIG. 8-a
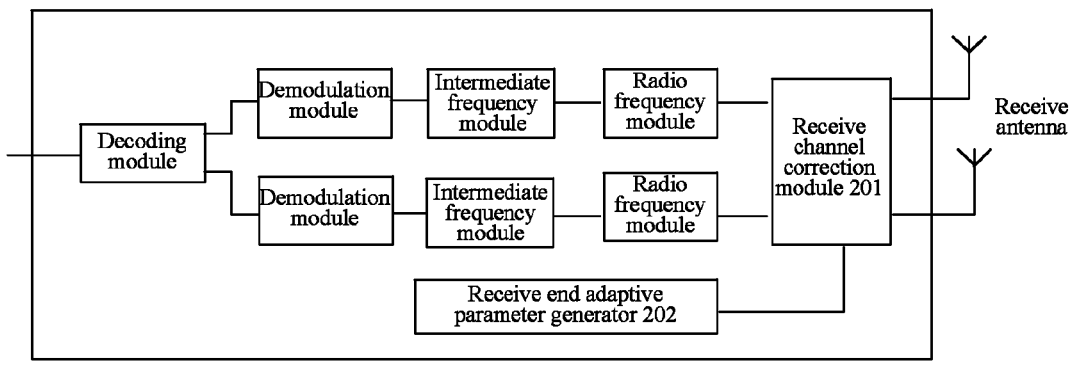
FIG. 8-b
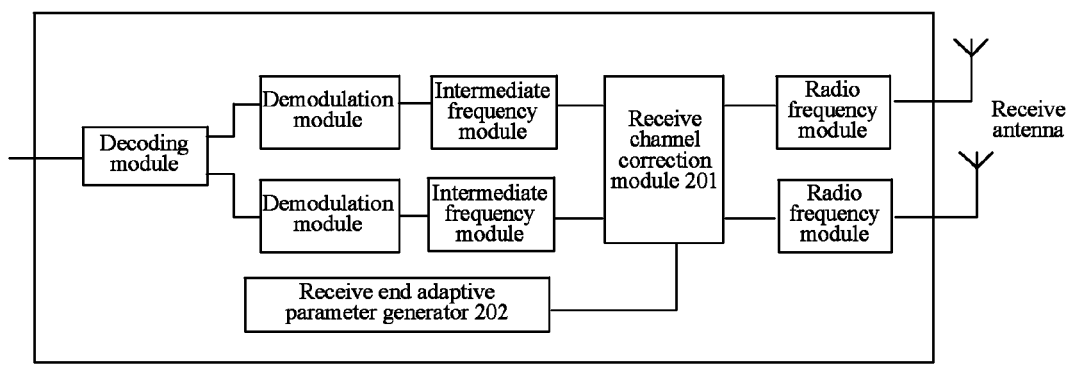
FIG. 8-c

METHOD, DEVICE, AND SYSTEM FOR IMPLEMENTING MICROWAVE MULTIPLE-INPUT MULTIPLE-OUTPUT

CROSS-REFERENCE TO RELATED APPLICATIONS

This application is a continuation of International Application No. PCT/CN2011/080862, filed on Oct. 17, 2011, which is hereby incorporated by reference in its entirety.

TECHNICAL FIELD

Embodiments of the present invention relate to the field of wireless communications, and in particular, to a method, device, and system for implementing microwave multiple-input multiple-output.

BACKGROUND

Compared with a SISO (Single-input Single-output, single-input single-output) system, a MIMO (Multi-input Multi-output, multiple-input multiple-output) system may increase channel capacity. In a wireless MIMO system, it is assumed that a channel is a Rayleigh fading channel, that is, the channel has no direct path but has various multipaths. In this situation, capacity of a MIMO channel may increase linearly according to the number of antennas.

For a microwave channel, a system generally provides a relatively strong direct path, and in this situation, the channel can be simulated into a Rician fading channel. In the Rician fading channel, a channel matrix is typically in low-rank state. That is, a part of eigenvalues $\lambda_i$ of a MIMO channel matrix is 0. According to the Shannon formula $$C = B \sum_{i=1}^{r} \log_2(1 + \lambda_i P_T / (\sigma^2 n_T)),$$

capacity of a MIMO system in low-rank state cannot be fully utilized, where $\lambda_i$ is an eigenvalue of a MIMO channel matrix, $P_T$ is average signal power, $\sigma^2$ is noise power, $n_T$ is the number of transmit antennas, r is the number of receive antennas, B is signal bandwidth, and C is channel capacity. A condition number in the MIMO system is defined as the ratio of the maximum eigenvalue of the channel matrix to the minimum eigenvalue of the channel matrix. Larger condition number results in stronger channel singularity. Smaller condition number approximating to 1 results in better orthogonality of the MIMO system. For a MIMO system with a Rician fading channel, when an antenna interval is a Rayleigh distance, multiple sub-channels of the MIMO system can maintain orthogonality, and a condition number of a channel approximates to 1, thereby supporting independent transmission of multiple data streams.

At present, two solutions are available for implementing microwave multiple-input multiple-output;

The first solution is as follows: Add a relay base station between microwave base station 1 and microwave base station 2, and generate independent transmission paths through forwarding by the relay base station, thereby increasing channel capacity. The essence of this solution is adding an independent sending path so that channel correlation approximates to 0.

The second solution is as follows: An interval between antennas of transceiver 3 is a Rayleigh interval, and an interval between antennas of transceiver 4 is also a Rayleigh interval. In this case, correlation of MIMO channels approximates to 0, thereby increasing channel capacity. For a 30 GHz frequency band, a Rayleigh distance required for 2 km transmission is 3 m. In this situation, an antenna array is difficult to achieve with a relatively large area.

In the process of implementing the present invention, the inventor finds at least the following problems in the prior art:

The first solution requires an extra relay base station to improve capacity of a microwave MIMO system, resulting in relatively high hardware costs, and a position selected for the relay base station is of vital importance, resulting in a difficulty in networking.

In the second solution, an interval between antennas of a transceiver is relatively large, the area of an antenna array is relatively large, and consequently the antenna array is difficult to achieve.

SUMMARY

To avoid extra hardware and reduce the area of an antenna array while implementing microwave MIMO, embodiments of the present invention provide a method, device, and system for implementing microwave multiple-input multiple-output.

The technical solutions are as follows:

A device for implementing microwave multiple-input multiple-output, including a transmit channel correction module, where:

the transmit channel correction module includes a transmission energy distributor and a transmission coupler;

the transmission energy distributor is configured to decompose, according to a first energy distribution parameter, each channel of transmitted signals among N channels of transmitted signals into channels of transmitted sub-signals, where the number of the channels of transmitted sub-signals is the same as the number of transmit antennas, the number of transmit antennas is N, and N is a natural number greater than 1; and the transmission coupler is configured to perform phase processing on each channel of transmitted sub-signals according to a first phase parameter, select one channel of phase-processed transmitted sub-signals from each of the N channels of transmitted signals, combine them to obtain N channels of output signals, and transmit the N channels of output signals through the N transmit antennas.

A device for implementing microwave multiple-input multiple-output, including a receive channel correction module, where:

the receive channel correction module includes a receiving energy distributor and a receiving coupler;

the receiving energy distributor is configured to decompose, according to a second energy distribution parameter, each channel of received signals among M channels of received signals into channels of received sub-signals, where the number of the channels of received sub-signals is the same as the number of receive antennas, the number of receive antennas is M, and M is a natural number greater than 1; and the receiving coupler is configured to perform phase processing on each channel of received sub-signals according to a second phase parameter, select one channel of phase-processed received sub-signals from each of the M channels of received signals, and combine them to obtain M channels of output signals.

A method for implementing microwave multiple-input multiple-output, including:

decomposing, according to a first energy distribution parameter, each channel of transmitted signals among N channels of transmitted signals into channels of transmitted sub-signals, where the number of the channels of transmitted sub-signals is the same as the number of transmit antennas, the number of transmit antennas is N, and N is a natural number greater than 1; and performing phase processing on each channel of transmitted sub-signals according to a first phase parameter, selecting one channel of phase-processed transmitted sub-signals from each of the N channels of transmitted signals, combining them to obtain N channels of output signals, and transmitting the N channels of output signals through the N transmit antennas.

A method for implementing microwave multiple-input multiple-output, including:

decomposing, according to a second energy distribution parameter, each channel of received signals among M channels of received signals into channels of received sub-signals, where the number of the channels of received sub-signals is the same as the number of receive antennas, the number of receive antennas is M, and M is a natural number greater than 1; and performing phase processing on each channel of received sub-signals according to a second phase parameter, selecting one channel of phase-processed received sub-signals from each of the M channels of received signals, and combining them to obtain M channels of output signals.

A system for implementing microwave multiple-input multiple-output, including a transmitter and a receiver, where the transmitter includes a transmit channel correction module, and the receiver includes a receive channel correction module;

the transmit channel correction module includes a transmission energy distributor and a transmission coupler;

the transmission energy distributor is configured to decompose, according to a first energy distribution parameter, each channel of transmitted signals among N channels of transmitted signals into channels of transmitted sub-signals, where the number of the channels of transmitted sub-signals is the same as the number of transmit antennas, the number of transmit antennas is N, and N is a natural number greater than 1;

the transmission coupler is configured to perform phase processing on each channel of transmitted sub-signals according to a first phase parameter, select one channel of phase-processed transmitted sub-signals from each of the N channels of transmitted signals, combine them to obtain N channels of output signals, and transmit the N channels of output signals through the N transmit antennas;

the receive channel correction module includes a receiving energy distributor and a receiving coupler;

the receiving energy distributor is configured to decompose, according to a second energy distribution parameter, each channel of received signals among N channels of received signals into channels of received sub-signals, where the number of the channels of received sub-signals is the same as the number of receive antennas, and the number of receive antennas is N; and the receiving coupler is configured to perform phase processing on each channel of received sub-signals according to a second phase parameter, select one channel of phase-processed received sub-signals from each of the N channels of received signals, and combine them to obtain N channels of output signals.

The beneficial effects of the technical solutions provided in the embodiments of the present invention are as follows:

Each channel of signals among N channels of signals is decomposed into channels of sub-signals according to an energy distribution parameter, where the number of the channels of sub-signals is the same as the number N of antennas. Phase processing is performed on each channel of sub-signals according to a phase parameter. One channel of phase-processed sub-signals is selected from each of the N channels of signals, and these selected channels of phase-processed sub-signals are combined to obtain N channels of output signals. In this way, the number of channel conditions in a MIMO system is reduced, so that a channel cascade result is equivalent to an impact of multipath on a channel, and channels in a microwave multiple-input multiple-output system can maintain orthogonality, thereby supporting independent transmission of multiple data streams. In addition, extra hardware is not required, achieving a smaller area of an antenna array.

BRIEF DESCRIPTION OF DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 3 is a schematic structural diagram of a transmit end adaptive parameter generator according to an embodiment of the present invention;

FIG. 4a is another schematic structural diagram of a device for implementing microwave multiple-input multiple-output according to an embodiment of the present invention;

FIG. 4b is another schematic structural diagram of a device for implementing microwave multiple-input multiple-output according to an embodiment of the present invention;

FIG. 4c is another schematic structural diagram of a device for implementing microwave multiple-input multiple-output according to an embodiment of the present invention;

FIG. 5 is a schematic structural diagram of a device for implementing microwave multiple-input multiple-output according to another embodiment of the present invention;

FIG. 8a is another schematic structural diagram of a device for implementing microwave multiple-input multiple-output according to another embodiment of the present invention;

FIG. 8b is another schematic structural diagram of a device for implementing microwave multiple-input multiple-output according to another embodiment of the present invention;

FIG. 8c is another schematic structural diagram of a device for implementing microwave multiple-input multiple-output according to another embodiment of the present invention;

DESCRIPTION OF EMBODIMENTS

To make the objectives, technical solutions, and advantages of the present invention more comprehensible, the following describes the embodiments of the present invention in further detail with reference to the accompanying drawings.

Figure 1:
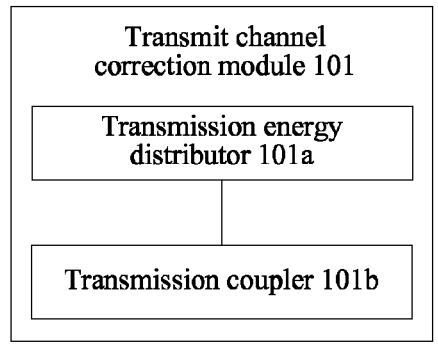
FIG. 1 is a schematic structural diagram of a device for implementing microwave multiple-input multiple-output according to an embodiment of the present invention.

Referring to FIG. 1, an embodiment of the present invention provides a device for implementing microwave multiple-input multiple-output. When the device is located on a transmitter, the device includes a transmit channel correction module 101; where the transmit channel correction module 101 includes a transmission energy distributor 101a and a transmission coupler 101b;

the transmission energy distributor 101a is configured to decompose, according to a first energy distribution parameter, each channel of transmitted signals among N channels of transmitted signals into channels of transmitted sub-signals, where the number of the channels of transmitted sub-signals is the same as the number of transmit antennas, the number of transmit antennas is N, and N is a natural number greater than 1; and the transmission coupler 101b is configured to perform phase processing on each channel of transmitted sub-signals according to a first phase parameter, select one channel of phase-processed transmitted sub-signals from each of the N channels of transmitted signals, combine them to obtain N channels of output signals, and transmit the N channels of output signals through the N transmit antennas.

Figure 2:
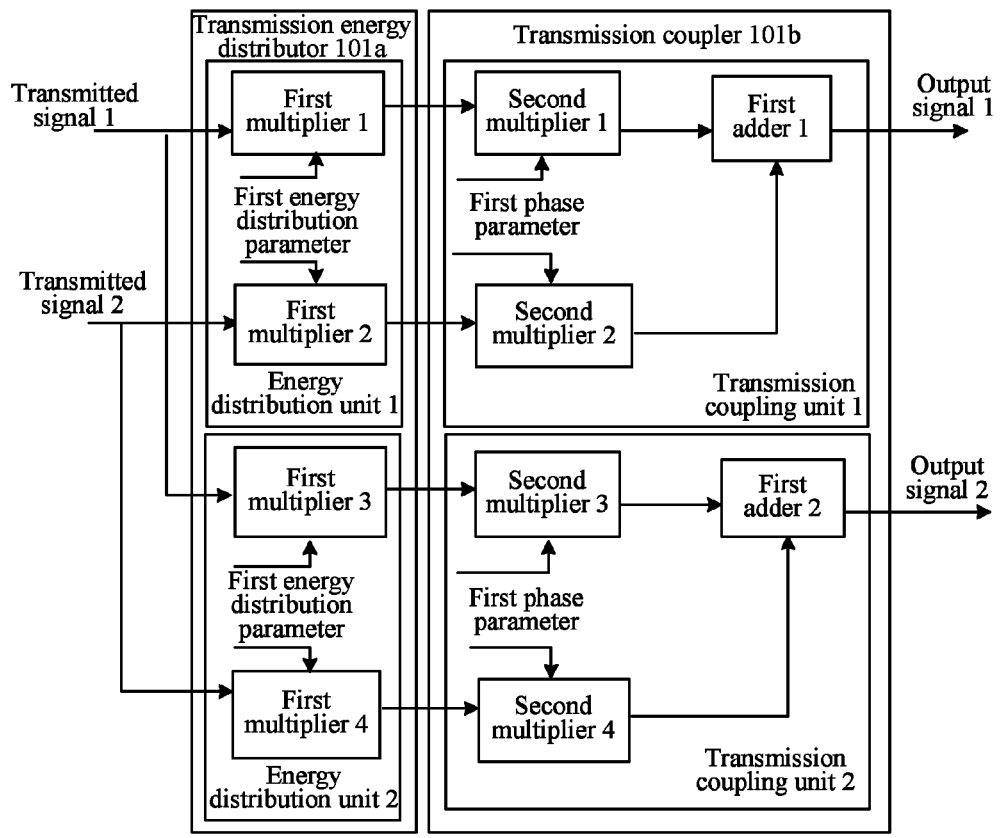
FIG. 2 is a schematic structural diagram of a transmit channel correction module according to an embodiment of the present invention.

During specific implementation, refer to FIG. 2 for a circuit diagram of the transmit channel correction module 101. In FIG. 2, a two-input two-output 2×2 antenna system is taken as an example for description.

The transmission energy distributor 101a is formed by N energy distribution units, each of the energy distribution units is formed by N first multipliers, and each of the first multipliers is configured to decompose one channel of transmitted signals to obtain one channel of transmitted sub-signals.

The transmission coupler 101b is formed by N transmission coupling units, each of the transmission coupling units is formed by N second multipliers and a first adder, each of the second multipliers is connected to the first adder, each of the second multipliers is configured to perform phase processing on one channel of transmitted sub-signals, and the first adder is configured to acquire phase-processed transmitted sub-signals from each of the N second multipliers and combine them to obtain one channel of output signals.

Further, the device further includes a transmit end adaptive parameter generator 102, configured to obtain the first energy distribution parameter and the first phase parameter through training or through calculation using a theoretical model. In this embodiment, a specific training method is not limited. One training method may be as follows: The transmit end adaptive parameter generator 102 sends a configuration parameter to the transmit channel correction module 101, observes a minimum mean square error or an error bit rate of a receiver where the device is located, and records a configuration parameter corresponding to the lowest minimum mean square error or error bit rate as a correction parameter. After that, channel conditions are changed. The channel conditions include a transmission distance, a carrier frequency, an antenna distance, and the like. The preceding experiment is repeated and a correction parameter is recorded until all channels are traversed.

During specific implementation, refer to FIG. 3 for the transmit end adaptive parameter generator 102. The transmit end adaptive parameter generator 102 includes a channel status information calculation unit, an energy selection unit, and a phase selection unit; where the channel status information calculation unit is configured to generate a decision threshold according to input channel status information;

the energy selection unit is configured to determine the first energy distribution parameter according to the decision threshold; and the phase selection unit is configured to determine the first phase parameter according to the decision threshold.

Further, the device further includes a modulation module configured to modulate baseband signals, an intermediate frequency module configured to perform a first frequency conversion on data, and a radio frequency module configured to perform a second frequency conversion on the data. According to whether the transmit channel correction module 101 is located on a baseband, a radio frequency, or an intermediate frequency, the preceding three modules have three connection relationships with the transmit channel correction module 101:

Referring to FIG. 4-a, the modulation module is connected to the transmit channel correction module 101, the transmit channel correction module 101 is connected to the intermediate frequency module, and the intermediate frequency module is connected to the radio frequency module; or referring to FIG. 4-b, the modulation module is connected to the intermediate frequency module, the intermediate frequency module is connected to the radio frequency module, and the radio frequency module is connected to the transmit channel correction module 101; or referring to FIG. 4-c, the modulation module is connected to the intermediate frequency module, the intermediate frequency module is connected to the transmit channel correction module 101, and the transmit channel correction module 101 is connected to the radio frequency module.

Further, the device further includes an encoding module that is connected to the modulation module and is configured to encode original signals before a function of the modulation module is executed.

In a microwave device, a transmitter and a receiver are generally integrated as one module, which concurrently has the functions of transmitting a microwave signal to a peer end and receiving the microwave signal from the peer end. Therefore, in this embodiment, a receive channel correction module 201 may further be included, configured to correct the microwave signal from the peer end.

Referring to FIG. 5, the receive channel correction module 201 includes a receiving energy distributor 201a and a receiving coupler 201b; where the receiving energy distributor 201a is configured to decompose, according to a second energy distribution parameter, each channel of received signals among M channels of received signals into channels of received sub-signals, where the number of the channels of received sub-signals is the same as the number of receive antennas, the number of receive antennas is M, and M is a natural number greater than 1; and the receiving coupler 201b is configured to perform phase processing on each channel of received sub-signals according to a second phase parameter, select one channel of phase-processed received sub-signals from each of the M channels of received signals, and combine them to obtain M channels of output signals.

Figure 6:
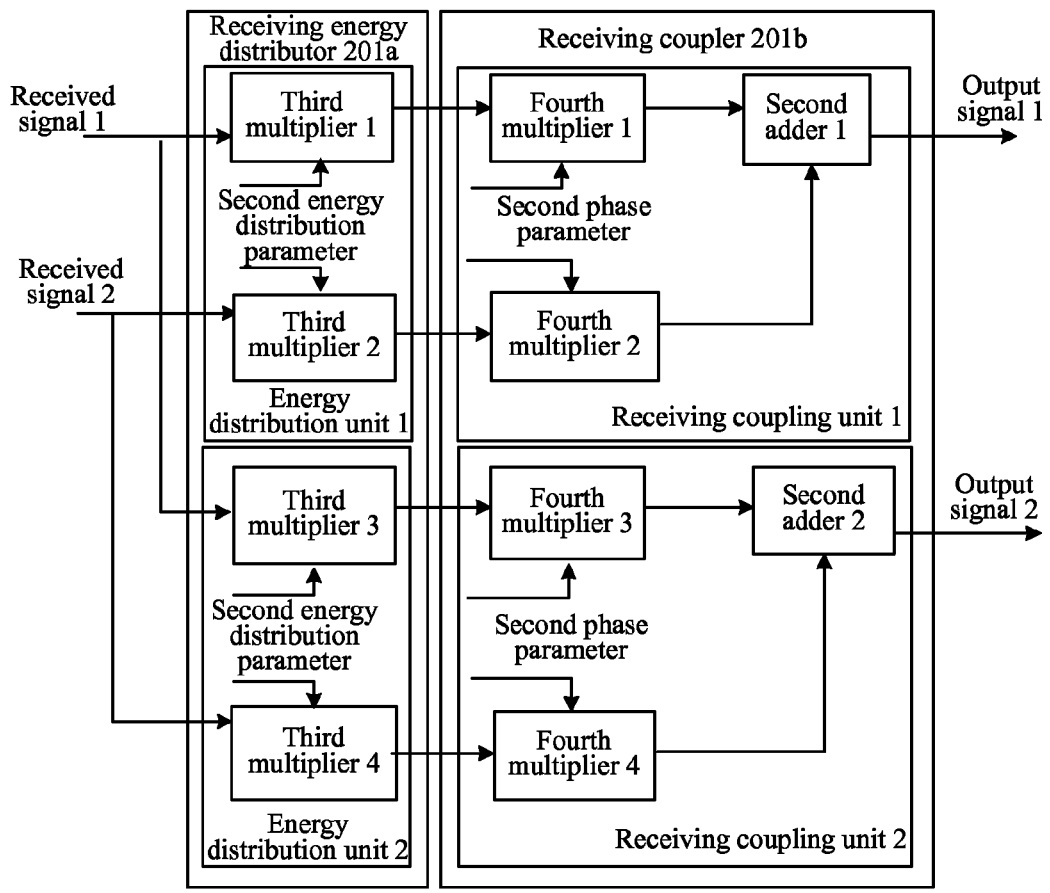
FIG. 6 is a schematic structural diagram of a receive channel correction module according to another embodiment of the present invention.

During specific implementation, refer to FIG. 6 for a circuit diagram of the receive channel correction module 201.

The receiving energy distributor 201a is formed by M energy distribution units, each of the energy distribution units is formed by M third multipliers, and each of the third multipliers is configured to decompose one channel of received signals to obtain one channel of received sub-signals.

The receiving coupler 201b is formed by M receiving coupling units, each of the receiving coupling units is formed by M fourth multipliers and a second adder, each of the fourth multipliers is connected to the second adder, each of the fourth multipliers is configured to perform phase processing on one channel of received sub-signals, and the second adder is configured to acquire phase-processed received sub-signals from each of the M fourth multipliers and combine them to obtain one channel of output signals.

Further, the device further includes a receive end adaptive parameter generator 202, configured to obtain the second energy distribution parameter and the second phase parameter through training or through calculation using a theoretical model. In this embodiment, a specific training method is not limited. One training method may be as follows: The receive end adaptive parameter generator 202 sends a configuration parameter to the receive channel correction module 201, observes a minimum mean square error or an error bit rate of the receiver where the device is located, and records a configuration parameter corresponding to the lowest minimum mean square error or error bit rate as a correction parameter. After that, channel conditions are changed. The channel conditions include a transmission distance, a carrier frequency, an antenna distance, and the like. The preceding experiment is repeated and a correction parameter is recorded until all channels are traversed.

Figure 7:
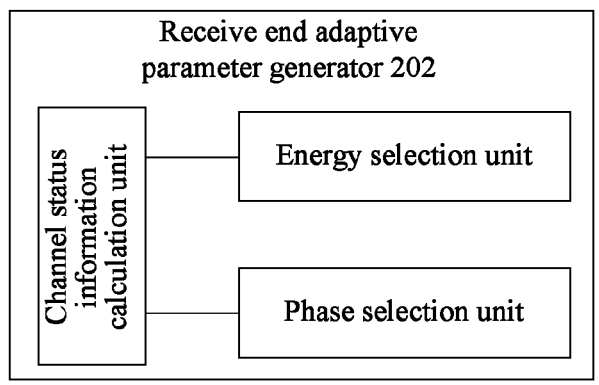
FIG. 7 is a schematic structural diagram of a receive end adaptive parameter generator according to another embodiment of the present invention.

During specific implementation, refer to FIG. 7 for the receive end adaptive parameter generator 202. The receive end adaptive parameter generator 202 includes a channel status information calculation unit, an energy selection unit, and a phase selection unit; where the channel status information calculation unit is configured to generate a decision threshold according to input channel status information;

the energy selection unit is configured to determine the second energy distribution parameter according to the decision threshold; and the phase selection unit is configured to determine the second phase parameter according to the decision threshold.

Further, the device further includes a demodulation module configured to demodulate baseband signals, an intermediate frequency module configured to perform a first frequency conversion on data, and a radio frequency module configured to perform a second frequency conversion on the data. According to whether the receive channel correction module 201 is located on a baseband, a radio frequency, or an intermediate frequency, the preceding three modules have three connection relationships with the receive channel correction module 201:

Referring to FIG. 8-a, the demodulation module is connected to the receive channel correction module 201, the receive channel correction module 201 is connected to the intermediate frequency module, and the intermediate frequency module is connected to the radio frequency module; or referring to FIG. 8-b, the demodulation module is connected to the intermediate frequency module, the intermediate frequency module is connected to the radio frequency module, and the radio frequency module is connected to the receive channel correction module 201; or referring to FIG. 8-c, the demodulation module is connected to the intermediate frequency module, the intermediate frequency module is connected to the receive channel correction module 201, and the receive channel correction module 201 is connected to the radio frequency module.

Further, the device further includes a decoding module that is connected to the demodulation module and is configured to decode original signals before a function of the demodulation module is executed.

Each channel of signals among N channels of signals is decomposed into channels of sub-signals according to an energy distribution parameter, where the number of the channels of sub-signals is the same as the number N of antennas. Phase processing is performed on each channel of sub-signals according to a phase parameter. One channel of phase-processed sub-signals is selected from each of the N channels of signals, and these selected channels of phase-processed sub-signals are combined to obtain N channels of output signals. In this way, the number of channel conditions in a MIMO system is reduced, so that a channel cascade result is equivalent to an impact of multipath on a channel, and channels in a microwave multiple-input multiple-output system can maintain orthogonality, thereby supporting independent transmission of multiple data streams. In addition, extra hardware is not required, achieving a smaller area of an antenna array.

Referring to FIG. 5, another embodiment of the present invention provides a device for implementing microwave multiple-input multiple-output. When the device is located on a receiver, the device includes a receive channel correction module 201.

The receive channel correction module 201 includes a receiving energy distributor 201a and a receiving coupler 201b; where the receiving energy distributor 201a is configured to decompose, according to a second energy distribution parameter, each channel of received signals among M channels of received signals into channels of received sub-signals, where the number of the channels of received sub-signals is the same as the number of receive antennas, the number of receive antennas is M, and M is a natural number greater than 1; and the receiving coupler 201b is configured to perform phase processing on each channel of received sub-signals according to a second phase parameter, select one channel of phase-processed received sub-signals from each of the M channels of received signals, and combine them to obtain M channels of output signals.

During specific implementation, refer to FIG. 6 for a circuit diagram of the receive channel correction module 201.

The receiving energy distributor 201a is formed by M energy distribution units, each of the energy distribution units is formed by M third multipliers, and each of the third multipliers is configured to decompose one channel of received signals to obtain one channel of received sub-signals.

The receiving coupler 201b is formed by M receiving coupling units, each of the receiving coupling units is formed by M fourth multipliers and a second adder, each of the fourth multipliers is connected to the second adder, each of the fourth multipliers is configured to perform phase processing on one channel of received sub-signals, and the second adder is configured to acquire phase-processed received sub-signals from each of the M fourth multipliers and combine them to obtain one channel of output signals.

Further, the device further includes a receive end adaptive parameter generator 202, configured to obtain the second energy distribution parameter and the second phase parameter through training or through calculation using a theoretical model. In this embodiment, a specific training method is not limited. One training method may be as follows: The receive end adaptive parameter generator 202 sends a configuration parameter to the receive channel correction module 201, observes a minimum mean square error or an error bit rate of the receiver where the device is located, and records a configuration parameter corresponding to the lowest minimum mean square error or error bit rate as a correction parameter. After that, channel conditions are changed. The channel conditions include a transmission distance, a carrier frequency, an antenna distance, and the like. The preceding experiment is repeated and a correction parameter is recorded until all channels are traversed.

During specific implementation, refer to FIG. 7 for the receive end adaptive parameter generator 202. The receive end adaptive parameter generator 202 includes a channel status information calculation unit, an energy selection unit, and a phase selection unit; where the channel status information calculation unit is configured to generate a decision threshold according to input channel status information;

the energy selection unit is configured to determine the second energy distribution parameter according to the decision threshold; and the phase selection unit is configured to determine the second phase parameter according to the decision threshold.

Further, the device further includes a demodulation module configured to demodulate baseband signals, an intermediate frequency module configured to perform a first frequency conversion on data, and a radio frequency module configured to perform a second frequency conversion on the data. According to whether the receive channel correction module 201 is located on a baseband, a radio frequency, or an intermediate frequency, the preceding three modules have three connection relationships with the receive channel correction module 201:

Referring to FIG. 8-*a*, the demodulation module is connected to the receive channel correction module 201, the receive channel correction module 201 is connected to the intermediate frequency module, and the intermediate frequency module is connected to the radio frequency module; or referring to FIG. 8-*b*, the demodulation module is connected to the intermediate frequency module, the intermediate frequency module is connected to the radio frequency module, and the radio frequency module is connected to the receive channel correction module 201; or referring to FIG. 8-*c*, the demodulation module is connected to the intermediate frequency module, the intermediate frequency module is connected to the receive channel correction module 201, and the receive channel correction module 201 is connected to the radio frequency module.

Further, the device further includes a decoding module that is connected to the demodulation module and is configured to decode original signals before a function of the demodulation module is executed.

Each channel of signals among N channels of signals is decomposed into channels of sub-signals according to an energy distribution parameter, where the number of the channels of sub-signals is the same as the number N of antennas. Phase processing is performed on each channel of sub-signals according to a phase parameter. One channel of phase-processed sub-signals is selected from each of the N channels of signals, and these selected channels of phase-processed sub-signals are combined to obtain N channels of output signals. In this way, the number of channel conditions in a MIMO system is reduced, so that a channel cascade result is equivalent to an impact of multipath on a channel, and channels in a microwave multiple-input multiple-output system can maintain orthogonality, thereby supporting independent transmission of multiple data streams. In addition, extra hardware is not required, achieving a smaller area of an antenna array.

Figure 9:
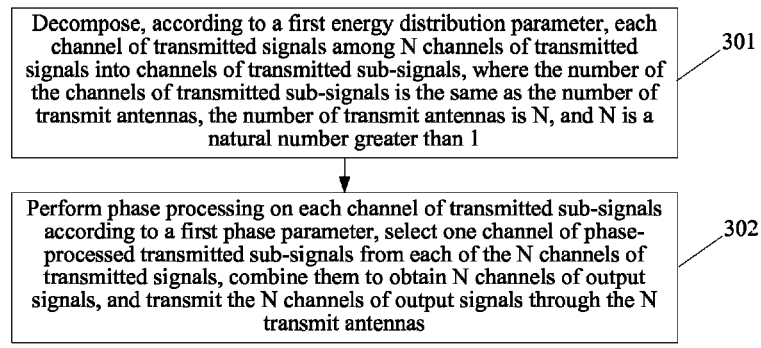
FIG. 9 is a flowchart of a method for implementing microwave multiple-input multiple-output according to another embodiment of the present invention.

Based on the embodiment illustrated in FIG. 1, referring to FIG. 9, another embodiment of the present invention provides a method for implementing microwave multiple-input multiple-output. The method includes:

301: Decompose, according to a first energy distribution parameter, each channel of transmitted signals among N channels of transmitted signals into channels of transmitted sub-signals, where the number of the channels of transmitted sub-signals is the same as the number of transmit antennas, the number of transmit antennas is N, and N is a natural number greater than 1.

302: Perform phase processing on each channel of transmitted sub-signals according to a first phase parameter, select one channel of phase-processed transmitted sub-signals from each of the N channels of transmitted signals, combine them to obtain N channels of output signals, and transmit the N channels of output signals through the N transmit antennas.

The first energy distribution parameter and the first phase parameter are obtained through training or through calculation using a theoretical model. For a specific training process, refer to the apparatus embodiment. Details are not repeated herein.

The transmitted signals are baseband signals, radio frequency signals, or intermediate frequency signals.

Each channel of signals among N channels of signals is decomposed into channels of sub-signals according to an energy distribution parameter, where the number of the channels of sub-signals is the same as the number N of antennas. Phase processing is performed on each channel of sub-signals according to a phase parameter. One channel of phase-processed sub-signals is selected from each of the N channels of signals, and these selected channels of phase-processed sub-signals are combined to obtain N channels of output signals. In this way, the number of channel conditions in a MIMO system is reduced, so that a channel cascade result is equivalent to an impact of multipath on a channel, and channels in a microwave multiple-input multiple-output system can maintain orthogonality, thereby supporting independent transmission of multiple data streams. In addition, extra hardware is not required, achieving a smaller area of an antenna array.

Figure 10:
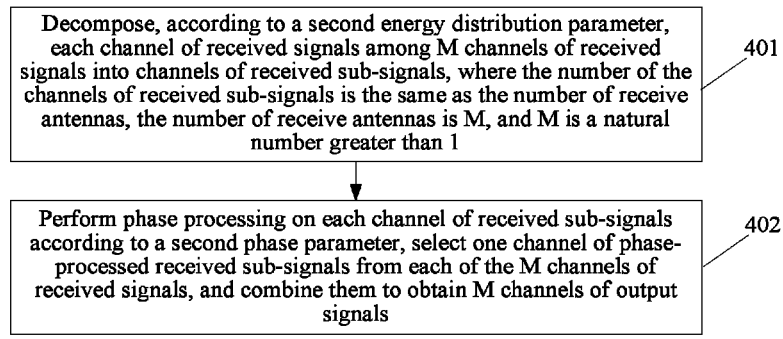
FIG. 10 is a flowchart of a method for implementing microwave multiple-input multiple-output according to another embodiment of the present invention.

Based on the embodiment illustrated in FIG. 5, referring to FIG. 10, another embodiment of the present invention provides a method for implementing microwave multiple-input multiple-output. The method includes:

401: Decompose, according to a second energy distribution parameter, each channel of received signals among M channels of received signals into channels of received sub-signals, where the number of the channels of received sub-signals is the same as the number of receive antennas, the number of receive antennas is M, and M is a natural number greater than 1.

402: Perform phase processing on each channel of received sub-signals according to a second phase parameter, select one channel of phase-processed received sub-signals from each of the M channels of received signals, and combine them to obtain M channels of output signals.

The second energy distribution parameter and the second phase parameter are obtained through training or through calculation using a theoretical model. For a specific training process, refer to the apparatus embodiment. Details are not repeated herein.

The received signals are baseband signals, radio frequency signals, or intermediate frequency signals.

Each channel of signals among N channels of signals is decomposed into channels of sub-signals according to an energy distribution parameter, where the number of the channels of sub-signals is the same as the number N of antennas. Phase processing is performed on each channel of sub-signals according to a phase parameter. One channel of phase-processed sub-signals is selected from each of the N channels of signals, and these selected channels of phase-processed sub-signals are combined to obtain N channels of output signals. In this way, the number of channel conditions in a MIMO system is reduced, so that a channel cascade result is equivalent to an impact of multipath on a channel, and channels in a microwave multiple-input multiple-output system can maintain orthogonality, thereby supporting independent transmission of multiple data streams. In addition, extra hardware is not required, achieving a smaller area of an antenna array.

Figure 11:
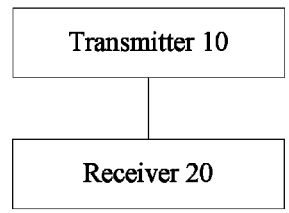
FIG. 11 is a schematic structural diagram of a system for implementing microwave multiple-input multiple-output according to another embodiment of the present invention.

Referring to FIG. 11, another embodiment of the present invention provides a system for implementing microwave multiple-input multiple-output. Generally, the number of transmit antennas of a transmitter is the same as the number of receive antennas of a receiver. The system includes a transmitter 10 and a receiver 20. The transmitter 10 includes a transmit channel correction module 101, and the receiver 20 includes a receive channel correction module 201.

The transmit channel correction module 101 includes a transmission energy distributor 101a and a transmission coupler 101b; where the transmission energy distributor 101a is configured to decompose, according to a first energy distribution parameter, each channel of transmitted signals among N channels of transmitted signals into channels of transmitted sub-signals, where the number of the channels of transmitted sub-signals is the same as the number of transmit antennas, the number of transmit antennas is N, and N is a natural number greater than 1; and the transmission coupler 101b is configured to perform phase processing on each channel of transmitted sub-signals according to a first phase parameter, select one channel of phase-processed transmitted sub-signals from each of the N channels of transmitted signals, combine them to obtain N channels of output signals, and transmit the N channels of output signals through the N transmit antennas.

The receive channel correction module 201 includes a receiving energy distributor 201a and a receiving coupler 201b; where the receiving energy distributor 201a is configured to decompose, according to a second energy distribution parameter, each channel of received signals among N channels of received signals into channels of received sub-signals, where the number of the channels of received sub-signals is the same as the number of receive antennas, and the number of receive antennas is N; and the receiving coupler 201b is configured to perform phase processing on each channel of received sub-signals according to a second phase parameter, select one channel of phase-processed received sub-signals from each of the N channels of received signals, and combine them to obtain N channels of output signals.

Assuming that a transfer function of the transmit channel correction module is Ha, a transfer function of the receive channel correction module is Hb, and an original channel is Ho, an improved channel is Hi=Ha×Ho×Hb.

During specific implementation, refer to FIG. 2 for a circuit diagram of the transmit channel correction module 101. In FIG. 2, a two-input two-output 2×2 antenna system is taken as an example for description.

The transmission energy distributor 101a is formed by N energy distribution units, each of the energy distribution units is formed by N first multipliers, and each of the first multipliers is configured to decompose one channel of transmitted signals to obtain one channel of transmitted sub-signals.

The transmission coupler 101b is formed by N transmission coupling units, each of the transmission coupling units is formed by N second multipliers and a first adder, each of the second multipliers is connected to the first adder, each of the second multipliers is configured to perform phase processing on one channel of transmitted sub-signals, and the first adder is configured to acquire phase-processed transmitted sub-signals from each of the N second multipliers and combine them to obtain one channel of output signals.

Further, the system further includes a transmit end adaptive parameter generator 102, configured to obtain the first energy distribution parameter and the first phase parameter through training or through calculation using a theoretical model. In this embodiment, a specific training method is not limited. One training method may be as follows: The transmit end adaptive parameter generator 102 sends a configuration parameter to the transmit channel correction module 101, observes a minimum mean square error or an error bit rate of the receiver where the device is located, and records a configuration parameter corresponding to the lowest minimum mean square error or error bit rate as a correction parameter. After that, channel conditions are changed. The channel conditions include a transmission distance, a carrier frequency, an antenna distance, and the like. The preceding experiment is repeated and a correction parameter is recorded until all channels are traversed.

During specific implementation, refer to FIG. 3 for the transmit end adaptive parameter generator 102. The transmit end adaptive parameter generator 102 includes a channel status information calculation unit, an energy selection unit, and a phase selection unit; where the channel status information calculation unit is configured to generate a decision threshold according to input channel status information;

the energy selection unit is configured to determine the first energy distribution parameter according to the decision threshold; and the phase selection unit is configured to determine the first phase parameter according to the decision threshold.

Further, the system further includes a modulation module configured to modulate baseband signals, an intermediate frequency module configured to perform a first frequency conversion on data, and a radio frequency module configured to perform a second frequency conversion on the data. According to whether the transmit channel correction module 101 is located on a baseband, a radio frequency, or an intermediate frequency, the preceding three modules have three connection relationships with the transmit channel correction module 101:

Referring to FIG. 4-a, the modulation module is connected to the transmit channel correction module 101, the transmit channel correction module 101 is connected to the intermediate frequency module, and the intermediate frequency module is connected to the radio frequency module; or referring to FIG. 4-b, the modulation module is connected to the intermediate frequency module, the intermediate frequency module is connected to the radio frequency module, and the radio frequency module is connected to the transmit channel correction module 101; or referring to FIG. 4-*c*, the modulation module is connected to the intermediate frequency module, the intermediate frequency module is connected to the transmit channel correction module 101, and the transmit channel correction module 101 is connected to the radio frequency module.

Further, the system further includes an encoding module that is connected to the modulation module and is configured to encode original signals before a function of the modulation module is executed.

During specific implementation, refer to FIG. 6 for a circuit diagram of the receive channel correction module 201.

The receiving energy distributor 201*a* is formed by N energy distribution units, each of the energy distribution units is formed by N third multipliers, and each of the third multipliers is configured to decompose one channel of received signals to obtain one channel of received sub-signals.

The receiving coupler 201*b* is formed by N receiving coupling units, each of the receiving coupling units is formed by N fourth multipliers and a second adder, each of the fourth multipliers is connected to the second adder, each of the fourth multipliers is configured to perform phase processing on one channel of received sub-signals, and the second adder is configured to acquire phase-processed received sub-signals from each of the N fourth multipliers and combine them to obtain one channel of output signals.

Further, the system further includes a receive end adaptive parameter generator 202, configured to obtain the second energy distribution parameter and the second phase parameter through training or through calculation using a theoretical model. In this embodiment, a specific training method is not limited. One training method may be as follows: The receive end adaptive parameter generator 202 sends a configuration parameter to the receive channel correction module 201, observes a minimum mean square error or an error bit rate of the receiver where the device is located, and records a configuration parameter corresponding to the lowest minimum mean square error or error bit rate as a correction parameter. After that, channel conditions are changed. The channel conditions include a transmission distance, a carrier frequency, an antenna distance, and the like. The preceding experiment is repeated and a correction parameter is recorded until all channels are traversed.

During specific implementation, refer to FIG. 7 for the receive end adaptive parameter generator 202. The receive end adaptive parameter generator 202 includes a channel status information calculation unit, an energy selection unit, and a phase selection unit; where the channel status information calculation unit is configured to generate a decision threshold according to input channel status information;

the energy selection unit is configured to determine the second energy distribution parameter according to the decision threshold; and the phase selection unit is configured to determine the second phase parameter according to the decision threshold.

Further, the system further includes a demodulation module configured to demodulate baseband signals, an intermediate frequency module configured to perform a first frequency conversion on data, and a radio frequency module configured to perform a second frequency conversion on the data. According to whether the receive channel correction module 201 is located on a baseband, a radio frequency, or an intermediate frequency, the preceding three modules have three connection relationships with the receive channel correction module 201:

Referring to FIG. 8-*a*, the demodulation module is connected to the receive channel correction module 201, the receive channel correction module 201 is connected to the intermediate frequency module, and the intermediate frequency module is connected to the radio frequency module; or referring to FIG. 8-*b*, the demodulation module is connected to the intermediate frequency module, the intermediate frequency module is connected to the radio frequency module, and the radio frequency module is connected to the receive channel correction module 201; or referring to FIG. 8-*c*, the demodulation module is connected to the intermediate frequency module, the intermediate frequency module is connected to the receive channel correction module 201, and the receive channel correction module 201 is connected to the radio frequency module.

Further, the system further includes a decoding module that is connected to the demodulation module and is configured to decode original signals before a function of the demodulation module is executed.

Each channel of signals among N channels of signals is decomposed into channels of sub-signals according to an energy distribution parameter, where the number of the channels of sub-signals is the same as the number N of antennas. Phase processing is performed on each channel of sub-signals according to a phase parameter. One channel of phase-processed sub-signals is selected from each of the N channels of signals, and these selected channels of phase-processed sub-signals are combined to obtain N channels of output signals. In this way, the number of channel conditions in a MIMO system is reduced, so that a channel cascade result is equivalent to an impact of multipath on a channel, and channels in a microwave multiple-input multiple-output system can maintain orthogonality, thereby supporting independent transmission of multiple data streams. In addition, extra hardware is not required, achieving a smaller area of an antenna array.

A person of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disc, or the like.

The foregoing describes only exemplary embodiments of the present invention and is not intended to limit the present invention. Any modification, equivalent replacement, or improvement made without departing the spirit and principle of the present invention shall fall within the protection scope of the present invention.

What is claimed is:

1. A device for implementing microwave multiple-input multiple-output, comprising:

a computer hardware configured to implement a transmit channel correction module, the transmit channel correction module comprising:

a transmission energy distributor configured to decompose, according to a first energy distribution parameter, each channel of transmitted signals among N channels of the transmitted signals into channels of transmitted sub-signals, wherein a number of the channels of the transmitted sub-signals is equal to a number of transmit antennas, the number of transmit antennas is N, and N is a natural number greater than 1, and a transmission coupler configured to perform phase processing on each channel of the transmitted sub-signals according to a first phase parameter, select one channel of the phase-processed transmitted sub-signals from each of the N channels of the transmitted signals, combine the phase-processed transmitted sub-signals to obtain N channels of output signals, and transmit the N channels of the output signals through the N transmit antennas, wherein the transmission energy distributor is formed by N energy distribution units, each of the energy distribution units is formed by N first multipliers, and each of the first multipliers is configured to decompose one channel of transmitted signals to obtain one channel of transmitted sub-signals, and the transmission coupler is formed by N transmission coupling units, each of the transmission coupling units is formed by N second multipliers and a first adder, each of the second multipliers is connected to the first adder, each of the second multipliers is configured to perform phase processing on one channel of transmitted sub-signals, and the first adder is configured to acquire phase-processed transmitted sub-signals from each of the N second multipliers and combine the phase-processed transmitted sub-signals to obtain one channel of output signals.

2. The device according to claim 1, wherein the device further comprises:
a transmit end adaptive parameter generator, configured to obtain the first energy distribution parameter and the first phase parameter through training or through calculation using a theoretical model.

3. The device according to claim 2, wherein the transmit end adaptive parameter generator comprises:
a channel status information calculation unit, an energy selection unit, and a phase selection unit;
the channel status information calculation unit is configured to generate a decision threshold according to input channel status information;
the energy selection unit is configured to determine the first energy distribution parameter according to the decision threshold; and
the phase selection unit is configured to determine the first phase parameter according to the decision threshold.

4. The device according to claim 1, wherein the device further comprises:
a modulation module configured to modulate baseband signals, an intermediate frequency module configured to perform a first frequency conversion on data, and a radio frequency module configured to perform a second frequency conversion on the data; and
the modulation module is connected to the transmit channel correction module, the transmit channel correction module is connected to the intermediate frequency module, and the intermediate frequency module is connected to the radio frequency module; or
the modulation module is connected to the intermediate frequency module, the intermediate frequency module is connected to the radio frequency module, and the radio frequency module is connected to the transmit channel correction module; or
the modulation module is connected to the intermediate frequency module, the intermediate frequency module is connected to the transmit channel correction module, and the transmit channel correction module is connected to the radio frequency module.

5. The device according to claim 1, wherein the device further comprises:
a receive channel correction module including a receiving energy distributor and a receiving coupler;

wherein the receiving energy distributor is configured to decompose, according to a second energy distribution parameter, each channel of received signals among M channels of received signals into channels of received sub-signals, wherein a number of the channels of received sub-signals is equal to the number of receive antennas, the number of receive antennas is M, and M is a natural number greater than 1; and wherein the receiving coupler is configured to perform phase processing on each channel of received sub-signals according to a second phase parameter, select one channel of phase-processed received sub-signals from each of the M channels of received signals, and combine the phase-processed received sub-signals to obtain M channels of output signals.

6. A device for implementing microwave multiple-input multiple-output, comprising:
a receive channel correction module, the receive channel correction module comprising:
a receiving energy distributor configured to decompose, according to a second energy distribution parameter, each channel of received signals among M channels of the received signals into channels of received sub-signals, wherein a number of the channels of received sub-signals is equal to a number of receive antennas, the number of receive antennas is M, and M is a natural number greater than 1, and
a receiving coupler configured to perform phase processing on each channel of the received sub-signals according to a second phase parameter, select one channel of the phase-processed received sub-signals from each of the M channels of received signals, and combine the phase-processed received sub-signals to obtain M channels of output signals, wherein the receiving energy distributor is formed by M energy distribution units, each of the energy distribution units is formed by M third multipliers, and each of the third multipliers is configured to decompose one channel of received signals to obtain one channel of received sub-signals, and the receiving coupler is formed by M receiving coupling units, each of the receiving coupling units is formed by M fourth multipliers and a second adder, each of the fourth multipliers is connected to the second adder, each of the fourth multipliers is configured to perform phase processing on one channel of received sub-signals, and the second adder is configured to acquire phase-processed received sub-signals from each of the M fourth multipliers and combine the phase-processed received sub-signals to obtain one channel of output signals.

7. The device according to claim 6, wherein the device further comprises:
a receive end adaptive parameter generator, configured to obtain the second energy distribution parameter and the second phase parameter through training or through calculation using a theoretical model.

8. The device according to claim 7, wherein the receive end adaptive parameter generator comprises:
a channel status information calculation unit, an energy selection unit, and a phase selection unit;
the channel status information calculation unit is configured to generate a decision threshold according to input channel status information;
the energy selection unit is configured to determine the second energy distribution parameter according to the decision threshold; and the phase selection unit is configured to determine the second phase parameter according to the decision threshold.

9. The device according to claim 6, wherein the device further comprises:
   a demodulation module configured to demodulate baseband signals, an intermediate frequency module configured to perform a first frequency conversion on data, and a radio frequency module configured to perform a second frequency conversion on the data; and
   the demodulation module is connected to the receive channel correction module, the receive channel correction module is connected to the intermediate frequency module, and the intermediate frequency module is connected to the radio frequency module; or
   the demodulation module is connected to the intermediate frequency module, the intermediate frequency module is connected to the radio frequency module, and the radio frequency module is connected to the receive channel correction module; or
   the demodulation module is connected to the intermediate frequency module, the intermediate frequency module is connected to the receive channel correction module, and the receive channel correction module is connected to the radio frequency module.

10. A method for implementing microwave multiple-input multiple-output, the method comprising:
   decomposing, according to a first energy distribution parameter, each channel of transmitted signals among N channels of the transmitted signals into channels of transmitted sub-signals, wherein a number of the channels of the transmitted sub-signals is equal to a number of transmit antennas, the number of transmit antennas is N, and N is a natural number greater than 1; and
   performing phase processing on each channel of the transmitted sub-signals according to a first phase parameter, selecting one channel of the phase-processed transmitted sub-signals from each of the N channels of the transmitted signals, combining the phase-processed transmitted sub-signals to obtain N channels of output signals, and transmitting the N channels of the output signals through the N transmit antennas,
   wherein a transmission energy distributor formed by N energy distribution units is provided, each of the energy distribution units is formed by N first multipliers, and each of the first multipliers is configured to decompose one channel of transmitted signals to obtain one channel of transmitted sub-signals, and
   a transmission coupler formed by N transmission coupling units is provided, each of the transmission coupling units is formed by N second multipliers and a first adder, each of the second multipliers is connected to the first adder, each of the second multipliers is configured to perform phase processing on one channel of transmitted sub-signals, and the first adder is configured to acquire phase-processed transmitted sub-signals from each of the N second multipliers and combine the phase-processed transmitted sub-signals to obtain one channel of output signals.

11. The method according to claim 10, wherein the first energy distribution parameter and the first phase parameter are obtained through training or through calculation using a theoretical model.

12. The method according to claim 10, wherein the transmitted signals are baseband signals, radio frequency signals, or intermediate frequency signals.

13. The method according to claim 10, wherein the method further comprises:
   decomposing, according to a second energy distribution parameter, each channel of received signals among M channels of received signals into channels of received sub-signals, wherein the number of the channels of received sub-signals is equal to a number of receive antennas, the number of receive antennas is M, and M is a natural number greater than 1; and
   performing phase processing on each channel of the received sub-signals according to a second phase parameter, selecting one channel of phase-processed received sub-signals from each of the M channels of received signals, and combining the phase-processed received sub-signals to obtain M channels of output signals.

14. A method for implementing microwave multiple-input multiple-output, the method comprising:
   decomposing, according to a second energy distribution parameter, each channel of received signals among M channels of the received signals into channels of received sub-signals, wherein a number of the channels of received sub-signals is equal to a number of receive antennas, the number of receive antennas is M, and M is a natural number greater than 1; and
   performing phase processing on each channel of the received sub-signals according to a second phase parameter, selecting one channel of phase-processed received sub-signals from each of the M channels of received signals, and combining the phase-processed received sub-signals to obtain M channels of output signals,
   wherein a transmission energy distributor formed by N energy distribution units is provided, each of the energy distribution units is formed by N first multipliers, and each of the first multipliers is configured to decompose one channel of transmitted signals to obtain one channel of transmitted sub-signals, and
   a transmission coupler formed by N transmission coupling units is provided, each of the transmission coupling units is formed by N second multipliers and a first adder, each of the second multipliers is connected to the first adder, each of the second multipliers is configured to perform phase processing on one channel of transmitted sub-signals, and the first adder is configured to acquire phase-processed transmitted sub-signals from each of the N second multipliers and combine the phase-processed transmitted sub-signals to obtain one channel of output signals.

15. The method according to claim 14, wherein the second energy distribution parameter and the second phase parameter are obtained through training or through calculation using a theoretical model.

16. The method according to claim 14, wherein the received signals are baseband signals, radio frequency signals, or intermediate frequency signals.

* * * * *